(12) United States Patent
Kawamoto et al.

(10) Patent No.: US 9,812,819 B2
(45) Date of Patent: Nov. 7, 2017

(54) POWER CORD

(71) Applicant: PANASONIC INTELLECTUAL PROPERTY MANAGEMENT CO., LTD., Osaka (JP)

(72) Inventors: Takashi Kawamoto, Mie (JP); Maki Kondou, Osaka (JP); Ryota Tomiyama, Mie (JP); Koji Yamato, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 403 days.

(21) Appl. No.: 14/571,116

(22) Filed: Dec. 15, 2014

(65) Prior Publication Data

US 2015/0171568 A1    Jun. 18, 2015

(30) Foreign Application Priority Data

Dec. 13, 2013  (JP) ................................. 2013-257874

(51) Int. Cl.
*H02H 5/00* (2006.01)
*H01R 13/66* (2006.01)
*H01R 13/713* (2006.01)
*H02H 3/08* (2006.01)
*H02H 5/04* (2006.01)

(52) U.S. Cl.
CPC ..... *H01R 13/6683* (2013.01); *H01R 13/7137* (2013.01); *H02H 3/085* (2013.01); *H02H 5/043* (2013.01)

(58) Field of Classification Search
CPC .................................................. H01R 13/6683
USPC ............................................................ 361/106
See application file for complete search history.

(56) References Cited

U.S. PATENT DOCUMENTS

| 5,590,010 A | * | 12/1996 | Ceola ................. H01R 13/7137 337/13 |
| 9,362,690 B2 | * | 6/2016 | Huang ............... H01R 13/6683 |
| 2012/0119702 A1 | | 5/2012 | Gaul et al. |

FOREIGN PATENT DOCUMENTS

| CN | 102484341 A | 5/2012 |
| JP | 07-067245 A | 3/1995 |
| JP | 2009-043509 A | 2/2009 |

OTHER PUBLICATIONS

Notification of First Office Action issued in corresponding Chinese Patent Application No. 201410770602.5, dated Jun. 21, 2016; with English translation.

(Continued)

*Primary Examiner* — Stephen W Jackson
(74) *Attorney, Agent, or Firm* — McDermott Will & Emery LLP (57) ABSTRACT

A power cord includes a plug and a load connection portion connected to a load. The plug contains a plurality of plug pins which are respectively inserted in plug pin insertion holes of a power socket and connected to the power socket and a plurality of PTC thermistors, at least one of which is provided for each of the plug pins to detect a temperature of the corresponding plug pin. The PTC thermistors form one series circuit, and the power cord includes a shut-off device which turns off power supply to the load connection portion from the plug pins when a resistance value of the series circuit is equal to or higher than a predetermined value.

2 Claims, 12 Drawing Sheets

(56) References Cited

OTHER PUBLICATIONS

Extended European Search Report issued in corresponding European Patent Application No. 14197641.5 dated Apr. 22, 2015; 6 pages.

* cited by examiner

POWER CORD

CROSS-REFERENCE TO RELATED APPLICATION

This application claims priority to Japanese Patent Application No. 2013-257874 filed on Dec. 13, 2013, the entire contents of which are incorporated herein by reference.

TECHNICAL FIELD

The present disclosure relates to a power cord.

BACKGROUND ART

Conventionally, there is provided a power cord including a plug connected to a power socket, a temperature sensor for detecting the temperature of the plug, and a shut-off device for stopping the power supply to a load from the plug when an abnormal temperature rise is detected by the temperature sensor (see, e.g., Japanese Unexamined Patent Application Publication No. H7-67245). The plug has a plurality of plug pins, each being inserted into the power socket and brought into contact and conduction with a pin rest in the power socket.

According to the power cord of this type, even when abnormal heat generation occurs because of a contact failure of the plug pins of the plug at the power socket, fire or damage to the plug due to the heat can be prevented by stopping the power supply.

In a case where only one temperature sensor is provided, a correlation between the output of the temperature sensor and the temperature of the plug pin farthest from the temperature sensor among the plurality of plug pins becomes relatively low. Accordingly, response to the temperature rise at the corresponding plug pin becomes slow, and safety may be reduced.

On the other hand, in a case where a plurality of temperature sensors is provided and the output of each temperature sensor is monitored individually, it may cause an increase in the number of parts and/or complication of a wiring.

SUMMARY OF THE INVENTION

In view of the above, the present disclosure provides a power cord capable of improving safety and avoiding an increase in the number of parts and complication of a wiring.

In accordance with an aspect of the present invention, there is provided a power cord including: a plug having a plurality of plug pins which are adapted to be respectively inserted in plug pin insertion holes of a power socket and connected with the power socket, and a plurality of PTC (Positive Temperature Coefficient) thermistors, at least one of which is provided for each of the plug pins to detect a temperature of the corresponding plug pin; and a load connection portion to be connected to a load. The PTC thermistors form one series circuit. The power cord further includes a shut-off device configured to turn off power supply to the load connection portion from the plug pins when a resistance value of the series circuit is equal to or higher than a predetermined value.

In accordance with another aspect of the present invention, there is provided a power cord including a plug having a plurality of plug pins which are adapted to be respectively inserted in plug pin insertion holes of a power socket and connected with the power socket, and a plurality of PTC (Positive Temperature Coefficient) thermistors, at least one of which is provided for each of the plug pins to detect a temperature of the corresponding plug pin. The power cord further includes a load connection portion to be connected to a load which includes a control circuit for controlling an amount of a current inputted through the plug pins and the load connection portion. The PTC thermistors form one series circuit.

The power cord further includes a communications circuit configured to transmit a notification signal to the control circuit when a resistance value of the series circuit is equal to higher than a predetermined value.

In accordance with the aspects of the present invention, compared with a case where only one PTC (Positive Temperature Coefficient) thermistor is provided, safety can be improved. In addition, since the resistance value of the series circuit of PTC thermistors is used, it is possible to avoid an increase in the number of parts or complication of a wiring unlike a case where the resistance values of PTC thermistors are individually detected.

BRIEF DESCRIPTION OF THE DRAWINGS

The figures depict one or more implementations in accordance with the present teaching, by way of example only, not by way of limitations. In the figures, like reference numerals refer to the same or similar elements.

FIGS. 5A to 5C illustrate the plug in accordance with the embodiment of the present invention, wherein

FIGS. 8A to 8D show a sensor holding member in accordance with the embodiment of the present invention, wherein

DETAILED DESCRIPTION

Hereinafter, a best mode for implementing the present invention will be described with reference to the drawings.

First Embodiment

Figure 2:
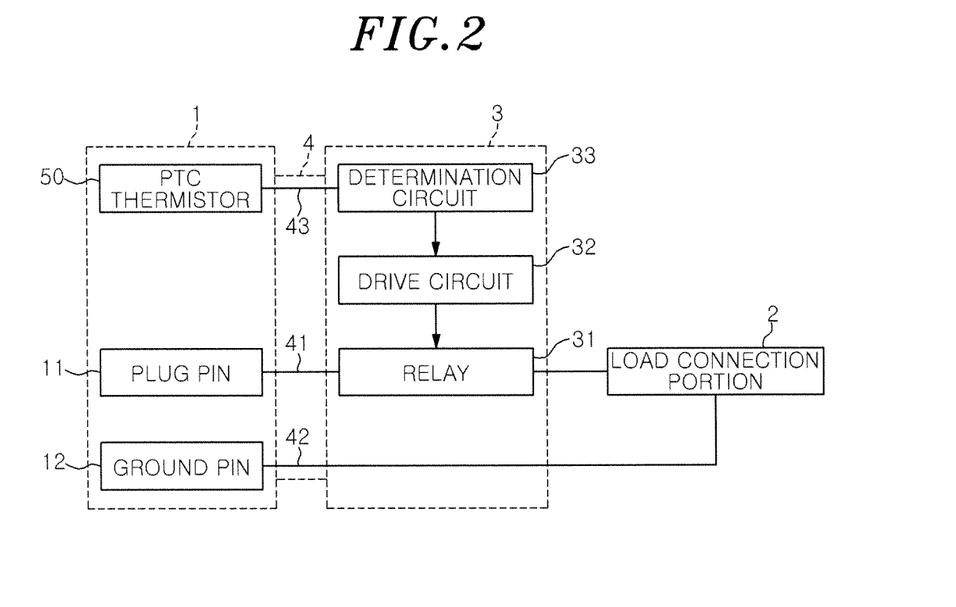
FIG. 2 is a block diagram of the power cord in accordance with the embodiment of the present invention.
Figure 3:
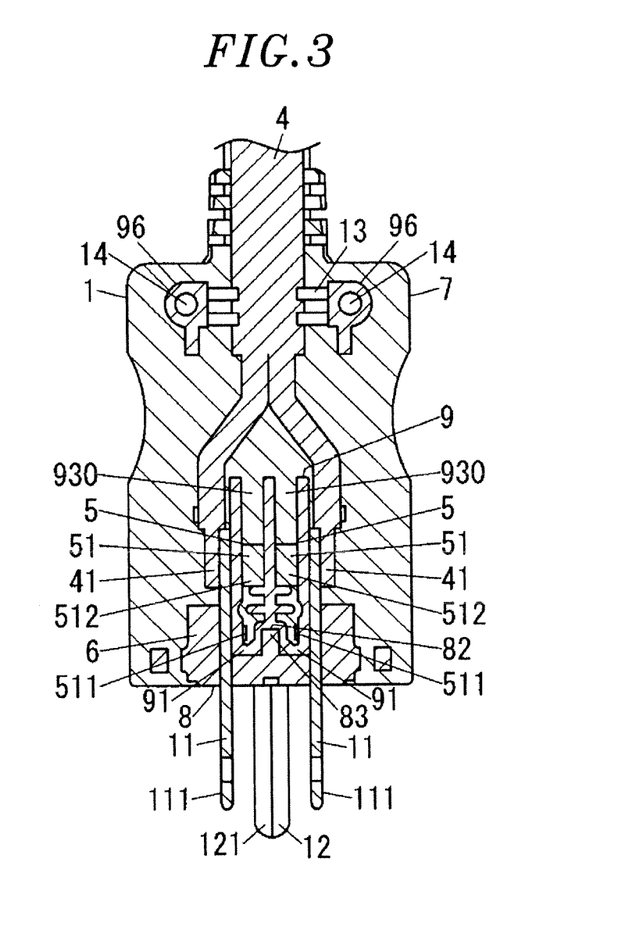
FIG. 3 is a cross-sectional view showing a plug of the power cord in accordance with the embodiment of the present invention, which is taken along line III-III' of FIG. 4.

A power cord in accordance with the present embodiment includes a plug 1 connected to a power socket (not shown), a load connection portion 2 connected to a load and a shut-off device 3 for turning on/off power supply to the load connection portion 2 from the plug 1, as shown in FIG. 2.

The load connection portion 2 may be a connector, or may be a wire connected to a terminal structure (e.g., screw terminal) of the load.

The plug 1 is a plug with two poles and a grounding electrode, which is specified in Japanese Industrial Standards (JIS) C8303 class I. The plug 1 includes, as shown in FIGS. 3 to 6, a pair of plug pins 11 constituting a voltage side pole and a ground side pole, respectively, to be used in transmission of a power, and a ground pin 12 constituting the grounding electrode. Each of the plug pins 11 and the ground pin 12 is made of a conductive material such as a metal.

The plug pins 11 are connected to the shut-off device 3 through power supply lines 41 included in a cable 4 which connects the plug 1 to the shut-off device 3. The shut-off device 3 includes a relay 31 such as an electromagnetic relay for turning on/off electrical connection (conduction) between the load connection portion 2 and one or both of the plug pins 11, and a drive circuit 32 for driving the relay 31.

Further, the ground pin 12 is connected to the load connection portion 2 through a ground line 42 included in the cable 4.

Figure 4:
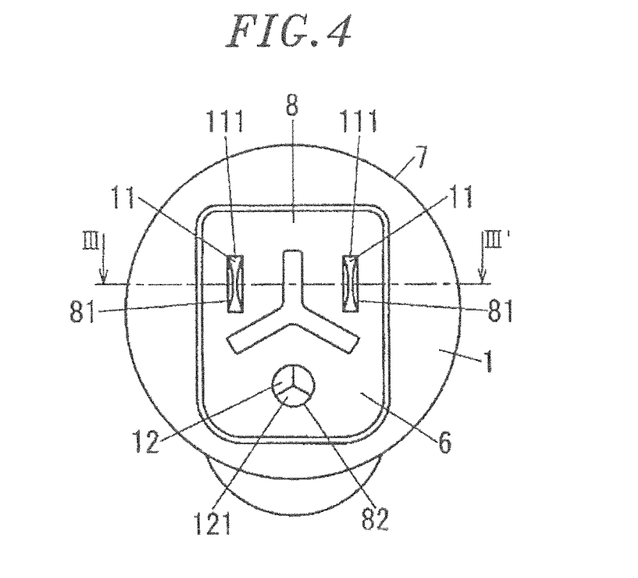
FIG. 4 is a front view showing the plug in accordance with the embodiment of the present invention.
Figure 5A:
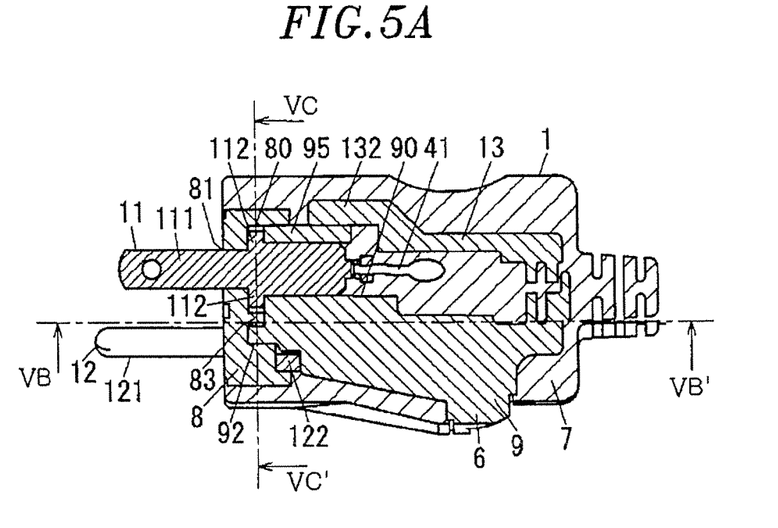
FIG. 5A is a cross-sectional view taken along line VA-VA' of FIG. 5C.
Figure 5B:
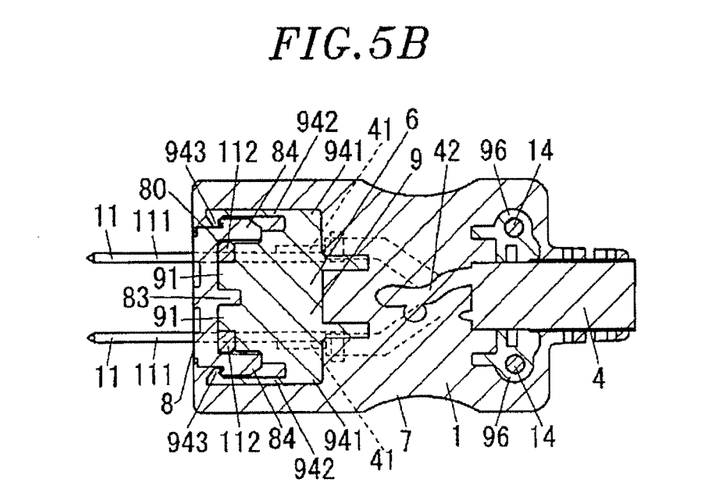
FIG. 5B is a cross-sectional view taken along line VB-VB' of FIG. 5A.
Figure 5C:
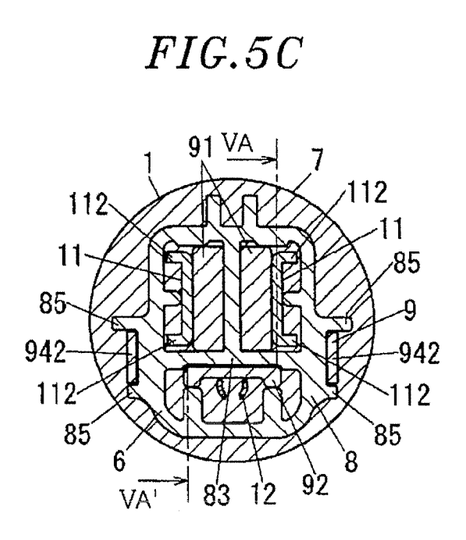
FIG. 5C is a cross-sectional view taken along line VC-VC' of FIG. 5A.
Figure 6:
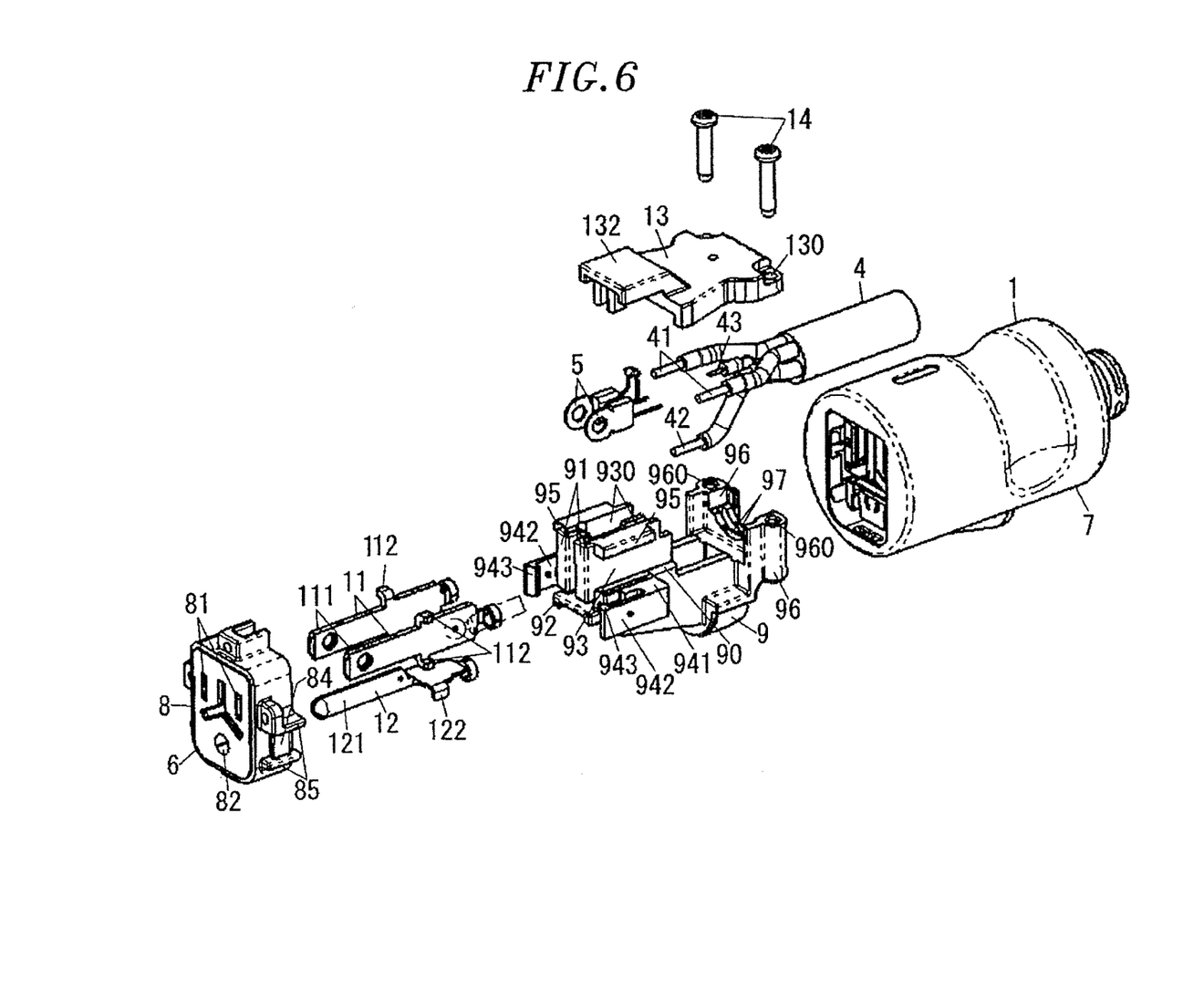
FIG. 6 is an exploded perspective view showing the plug in accordance with the embodiment of the present invention.

The terms "up," "down," "left" and "right" are used herein with respect to the state shown in FIG. 4. The front side (lower side in FIG. 3) of the paper sheet of FIG. 4 is referred to as a front side. In other words, a direction in which the plug pins 11 are aligned is referred to as a left-right direction (lateral direction), a direction in which the ground pin 12 is positioned with respect to the plug pins 11 is referred to as a downward direction, and a direction in which the plug pins 11 and the ground pin 12 protrude from the plug 1 is referred to as a forward direction.

The plug 1 further includes a core part 6 and a housing 7. The core part 6 is made of an insulating material such as synthetic resin which holds the plug pins 11 and the ground pin 12. The housing 7 is formed of a synthetic resin molded product that encloses the core part 6. The core part 6 includes a body 8 through which the plug pins 11 and the ground pin 12 are inserted, and a sensor holding member 9 which is coupled to the body 8 to hold temperature sensors 5. The body 8 and the sensor holding member 9 are made of, e.g., synthetic resin. Further, the front surface of the body 8 is exposed at the front surface of the plug 1 without being covered by the housing 7.

The plug 1 further includes two PTC (Positive Temperature Coefficient) thermistors 50. The PTC thermistors 50 one-to-one correspond to the plug pins 11. Each of the PTC thermistors 50 detects the temperature of the corresponding plug pin 11. Specifically, a distance between each of the PTC thermistors 50 and the corresponding plug pin 11 is smaller than a distance between the plug pins 11. Thus, compared to a case where the distance between each of the PTC thermistors 50 and the corresponding plug pin 11 is larger than the distance between the plug pins 11, a correlation between the temperature of the plug pin 11 and an output (resistance value) of the PTC thermistor 50 becomes stronger.

Figure 7:
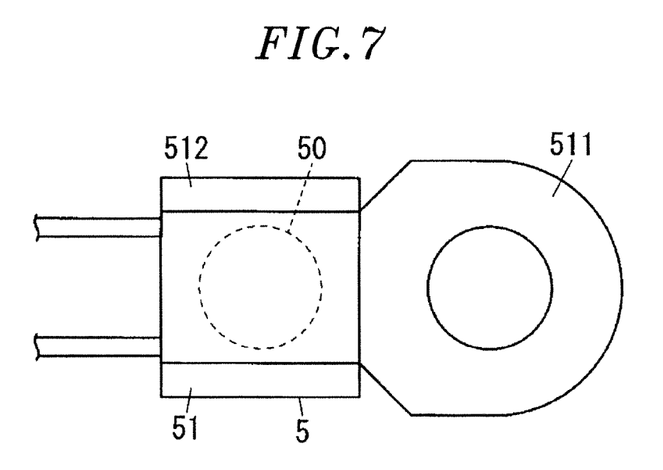
FIG. 7 is a side view showing a temperature sensor in accordance with the embodiment of the present invention.
Figure 8A:
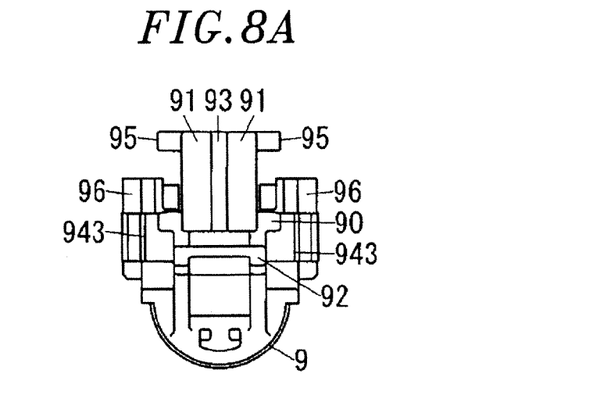
FIG. 8A is a front view.
Figure 8B:
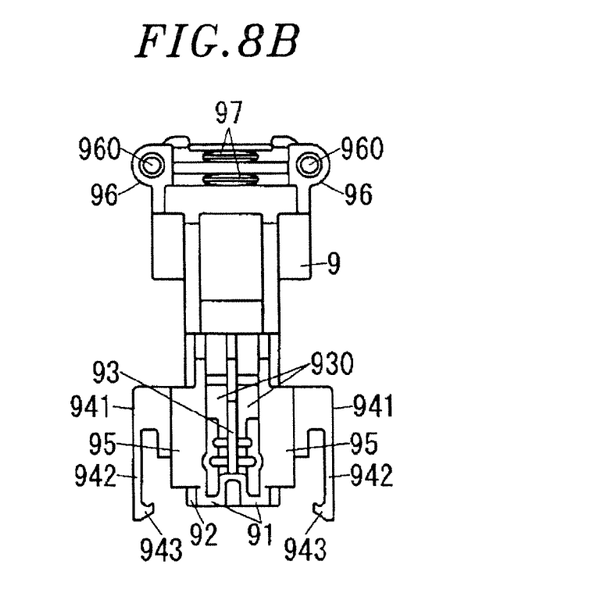
FIG. 8B is a plan view.
Figure 8C:
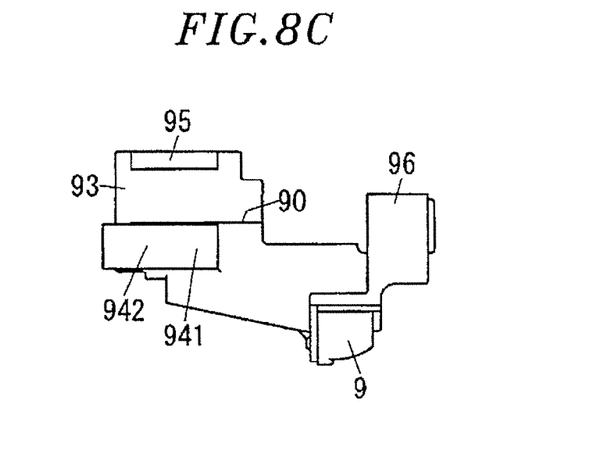
FIG. 8C is a right side view.
Figure 8D:
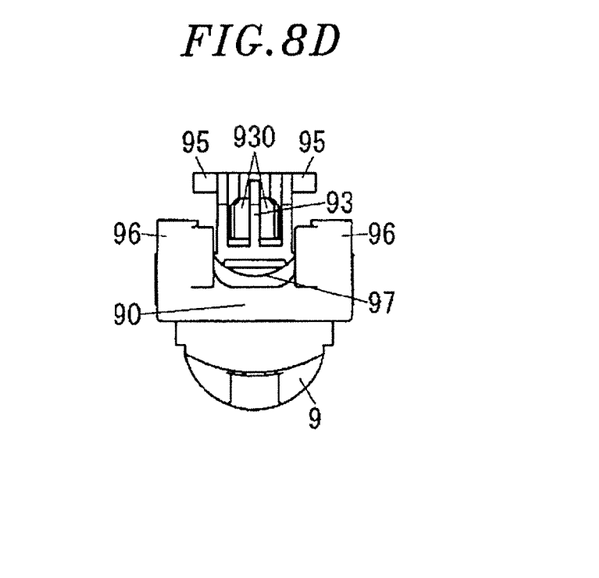
FIG. 8D is a rear view.

As shown in FIG. 7, each of the PTC thermistors 50 is held in a holder 51 made of metal to constitute the temperature sensor 5. The holder 51 has a structure similar to that of a lug terminal which is known widely. The holder 51 includes a fixed portion 511 of an annular shape, and a body portion 512 accommodating the PTC thermistor 50 therein. The PTC thermistors 50 are connected to the shut-off device 3 through signal lines 43. The signal lines 43 constitute the cable 4 together with the power supply lines 41 and the ground line 42. The insulation between the holder 51 and the PTC thermistors 50 and between the holder 51 and the signal lines 43 is ensured by, e.g., epoxy resin (not shown) filled in the body portion 512 of the holder 51.

Each of the plug pins 11 includes a flat protrusion 111 which projects forwardly from the core part 6 while its thickness direction is in the left-right direction. The protrusions 111 are inserted into plug pin insertion holes (not shown) formed in the power socket as a connection target and are brought into contact and conduction with pin rests (not shown) of the voltage side pole and ground side pole accommodated in the plug pin insertion holes. Each of the plug pins 11 further includes retaining portions 112 which protrude from the protrusion 111 in an up-down direction (vertical direction) perpendicular to the projecting direction of the protrusion 111 from the core part 6.

The ground pin 12 is formed in a cylindrical shape whose axial direction is in a front-back direction. The ground pin 12 includes a protrusion 121 which projects forwardly from the core part 6. The protrusion 121 is brought into contact and conduction with a ground pin rest (not shown) included in the power socket as a connection target. The ground pin 12 further includes retaining portions 122 which protrude from the protrusion 121 in the left-right direction perpendicular to the projecting direction of the protrusion 121 from the core part 6.

On the rear surface of the body 8, a recess 80 is provided to receive parts of the plug pins 11 and the ground pin 12. In the bottom surface of the recess 80, there are provided two first through-holes 81 through which the protrusions 111 of the plug pins 11 are respectively inserted, and a second through-hole 82 through which the protrusion 121 of the ground pin 12 is inserted. The through-holes 81 and 82 have sizes and shapes such that only the protrusions 111 and 121 can be inserted and the retaining portions 112 and 122 cannot be inserted therethrough. The first through-holes 81 are aligned in the left-right direction, and the second through-hole 82 is provided below a position between the first through-holes 81.

Further, in the body 8, on the inside bottom surface (i.e., rear surface of the body 8) of the recess 80, a T-shaped partition wall 83 is installed to project backwardly from the body 8 as a partition between the plug pins 11 and between the ground pin 12 and the plug pins 11.

As shown in FIGS. 5A to 6 and FIGS. 8A to 8D, the sensor holding member 9 includes a main body 90 which is located below the plug pins 11, a wall portion 93 which is formed to protrude upwardly from the main body 90 and sandwiched between the plug pins 11, and holding portions 95 which are provided to project in both left and right directions from the top end of the wall portion 93 such that the plug pins 11 are held between the main body 90 and the holding portions 95.

The sensor holding member 9 further includes, at a front end portion, two first convex portions 91, each being inserted into the recess 80 and sandwiched between each of the plug pins 11 and the partition wall 83, and a second convex portion 92 inserted into the recess 80 and sandwiched between the ground pin 12 and the partition wall 83. The partition wall 83 is interposed between two adjacent portions among the two first convex portions 91 and the second convex portion 92, whereby the body 8 and the sensor holding member 9 are positioned with respect to each other.

The sensor holding member 9 further includes spring bases 941 which project in both left and right directions from the vicinity of the front end of the main body 90, and spring pieces 942 which project forwardly from the spring bases 941, respectively. Each of the spring pieces 942 has a flat shape in the front-back direction, and its front end portion can be displaced laterally by an elastical deformation. In addition, an engaging pawl 943 is provided to project inwardly in the left-right direction at the front end of each of the spring pieces 942.

Convex engaging portions 84 are provided to protrude from the left and right sides of the body 8. The body 8 is coupled to the sensor holding member 9 by being sandwiched between the spring pieces 942 in the left-right direction such that the engaging pawls 943 are engaged with the convex engaging portions 84 (i.e., the engaging pawls 943 are positioned on the front sides of the convex engaging portions 84). At the rear end portion of each of the convex engaging portions 84, an inclined surface is formed such that a projecting dimension is gradually reduced backwardly. Also, at the front end portion of the engaging pawl 943, an inclined surface is formed such that a projecting dimension is gradually reduced forwardly.

When the body 8 is coupled with the sensor holding member 9, in a state where the vertical position of the convex engaging portions 84 corresponds to the vertical position of the engaging pawls 943, the body 8 is pushed between the spring pieces 942 from the front side of the sensor holding member 9. At this time, the inclined surfaces are in sliding contact with each other and, thus, the spring pieces 942 are elastically deformed. Eventually, the convex engaging portions 84 reach the back sides of the engaging pawls 943, and the spring pieces 942 are elastically restored such that the engaging pawls 943 are engaged with the convex engaging portions 84. A pair of convex restricting portions 85 for restricting the spring pieces 942 of the sensor holding member 9 in the up-down direction is provided to protrude from each of both left and right surfaces of the body 8.

The cable 4 is extended backwardly from the core part 6 such that its axial direction is in the front-back direction. At the rear end of the main body 90 of the sensor holding member 9, two screw clamp portions 96 between which the cable 4 is sandwiched in the left-right direction (i.e., radial direction of the cable 4) are provided to protrude upwardly.

Further, the plug 1 in accordance with the present embodiment includes a tension stopper 13 which clamps the cable 4 in cooperation with the core part 6 (sensor holding member 9), the tension stopper 13 being inserted and molded together with the core part 6 in the housing 7. The tension stopper 13 is made of, e.g., synthetic resin. In addition, screw holes 960 are respectively formed in the screw clamp portions 96 of the sensor holding member 9. In the tension stopper 13, there are provided two screw insertion holes 130 communicating with the screw holes 960, respectively. The tension stopper 13 is fixed to the sensor holding member 9 by two screws 14 inserted through the screw insertion holes 130 and screwed into the screw holes 960, respectively.

Furthermore, clamping parts 97 and 131 (in FIGS. 6 and 9 and the like) having a flat shape in the front-back direction (longitudinal direction of the cable 4) are provided to protrude between the screw clamp portions 96 of the sensor holding member 9 and at the tension stopper 13, respectively. The distance between the clamping part 97 of the sensor holding member 9 and the clamping part 131 of the tension stopper 13 in a state where the sensor holding member 9 and the tension stopper 13 are coupled to each other is smaller than the external diameter of the cable 4 in a non-deformed state. Therefore, the clamping parts 97 and 131 clamp the cable 4, and the displacement of the cable 4 with respect to the core part 6 is suppressed.

At a stage before the housing 7 is molded, an up-down or left-right displacement of the plug pins 11 or the ground pin 12 with respect to the core part 6 is prevented by the inner surfaces of the through-holes 81 and 82 of the body 8. Each of the through-holes 81 and 82 of the body 8 has a size and shape such that the retaining portions 112 and 122 of the respective plug pin 11 and ground pin 12 cannot be inserted therethrough. Thus, the displacement (removal) of the plug pins 11 or the ground pin 12 in the forward direction (i.e., projecting direction of the protrusions 111 and 121) with respect to the core part 6 is prevented by contact of the retaining portions 112 and 122 with the inside bottom surface of the recess 80 of the body 8.

In addition, the sensor holding member 9 is located on the rear side of the retaining portions 112 and 122 of the plug pins 11 and the ground pin 12. Thus, the displacement of the plug pins 11 or the ground pin 12 in the backward direction (i.e., direction opposite to the projecting direction of the protrusions 111 and 121) with respect to the core part 6 is prevented by contact of the sensor holding member 9 with the retaining portions 112 and 122.

Figure 9:
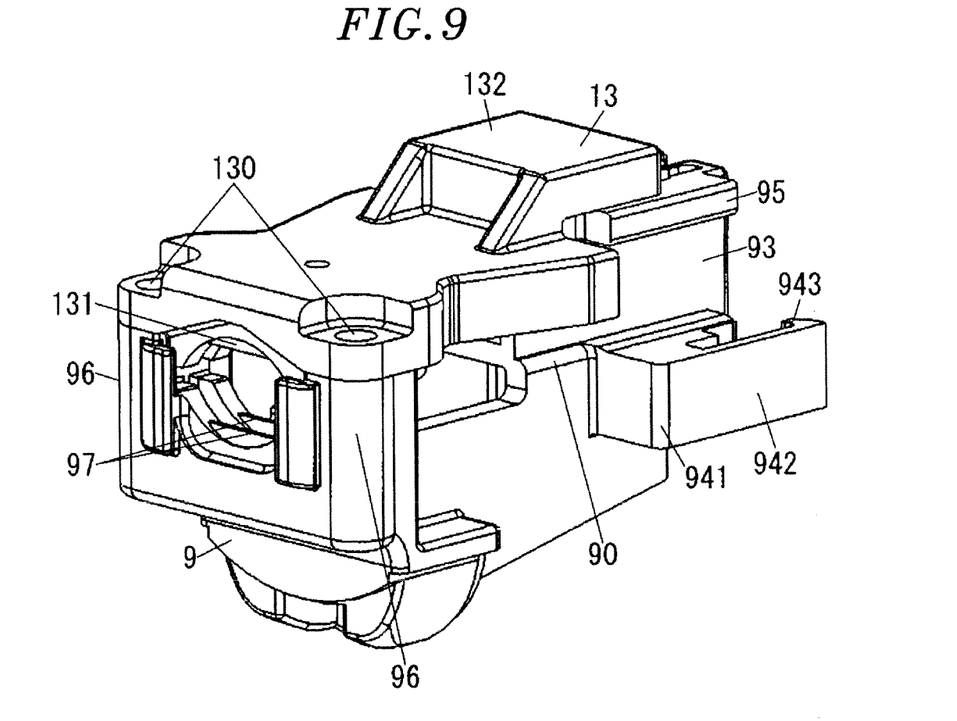
FIG. 9 is a perspective view showing a state in which the tension stopper is coupled to the sensor holding member in accordance with the embodiment of the present invention.

Further, each of the temperature sensors 5 is held in the sensor holding member 9 by being inserted and fitted to each of two sensor accommodating recesses 930 which are opened at the upper side and the rear side of the wall portion 93 of the sensor holding member 9. That is, the sensor holding member 9 is interposed between the temperature sensors 5 and the plug pins 11. As shown in FIG. 9, the tension stopper 13 includes a cover portion 132 which covers the sensor accommodating recesses 930 in a state of being coupled to the sensor holding member 9.

The insulation between the temperature sensors 5 (PTC thermistors 50) and the signal lines 43, and the insulation between the plug pins 11 and the power supply lines 41 can be improved by the sensor holding member 9. As a means for coupling the body 8 and the sensor holding member 9 with each other, screwing may be used instead of the engagement, or in combination with the engagement. Further, by providing a through-hole (not shown) in each of the power supply lines 41, and inserting a caulking projection (not shown) provided in each of the plug pins 11 or the sensor holding member 9 into the through-hole, each of the power supply lines 41 may be fixed to each of the plug pins 11 or the sensor holding member 9.

Hereinafter, features of the present embodiment will be described.

Figure 10:
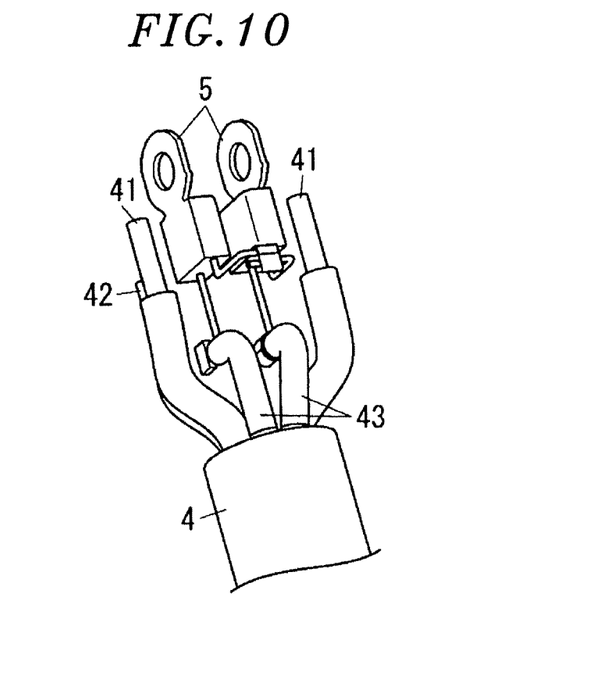
FIG. 10 is a perspective view showing primary parts of the embodiment of the present invention.

In the present embodiment, as shown in FIG. 10, two PTC thermistors 50 are configured such that one-side terminals thereof are connected to each other, and the other-side terminals thereof are connected to the shut-off device 3 via the signal lines 43, respectively. In other words, two PTC thermistors 50 are connected in series with each other to constitute one series circuit. The shut-off device 3 includes a determination circuit (DC) 33 for determining whether or not the plug pins 11 are in a high temperature state in which the plug pins 11 have an abnormally high temperature based on the resistance value of the series circuit.

Figure 1:
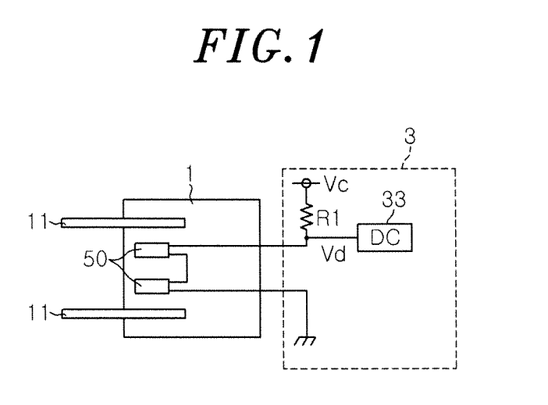
FIG. 1 is a schematic diagram of a power cord in accordance with an embodiment of the present invention.

As shown in FIG. 1, the series circuit has one end connected to the ground and the other end connected to a constant voltage source Vc through a fixed resistor R1. The determination circuit 33 determines whether or not the plug pins 11 are in the high temperature state, e.g., by comparing a voltage (i.e., voltage at a connection point between the series circuit and the fixed resistor R1, hereinafter referred to as "detection voltage") Vd across the series circuit with a predetermined determination voltage. That is, it is determined that the plug pins 11 are in the high temperature state if the detection voltage Vd is equal to or greater than the determination voltage (i.e., if the resistance value of the series circuit is equal to or greater than a predetermined value), and it is determined that the plug pins 11 are not in the high temperature state if the detection voltage Vd is less than the determination voltage. The determination circuit 33 may be implemented by using, e.g., a well-known comparator.

Figure 11:
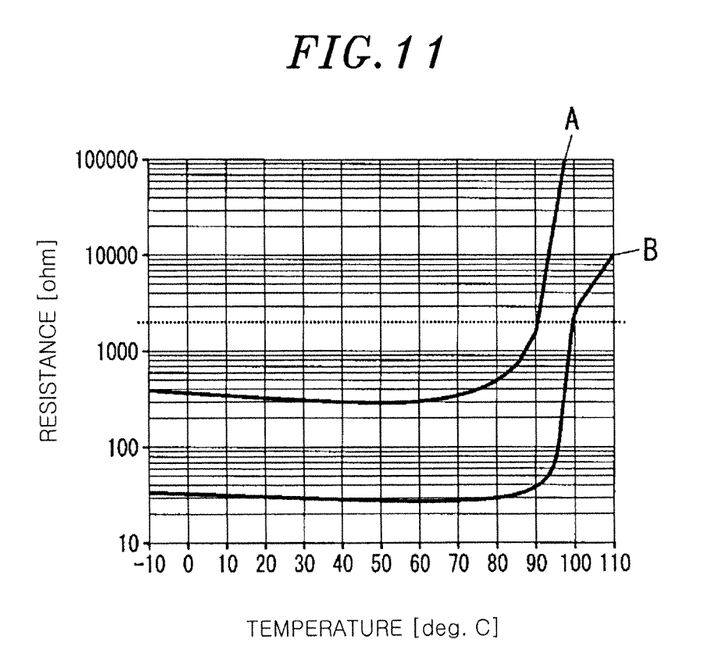
FIG. 11 is an explanatory diagram showing an example of temperature characteristics of the PTC thermistor.

As the PTC thermistor 50, there is used a thermistor which has, as shown in FIG. 11, a variation in temperature characteristics from a relatively high resistance value as represented by a curve A to a relatively low resistance value as represented by a curve B and an abrupt change in resistance value in a temperature range from 90° C. to 100° C. Even in case both two PTC thermistors 50 have temperature characteristics of curve B with a low resistance value, when the temperature of at least one of the PTC thermistors 50 reaches a predetermined determination temperature, the detection voltage Vd becomes equal to or greater than the determination voltage. The determination temperature is, e.g., a temperature which is sufficiently high such that there is no problem in practical use and is lower than a melting point of the housing 7. For example, in the example of curve B in FIG. 11, when the determination temperature is 100° C., the determination voltage becomes the detection voltage Vd when the resistance value of the series circuit is 2000 Ω (dashed line in FIG. 11).

The drive circuit 32 stops the power supply to the load connection portion 2 from the plug 1 (plug pins 11) by turning off the relay 31 when the high temperature state is determined by the determination circuit 33. The relay 31 may be a so-called single-pole switch for turning on/off the power supply between only one of the plug pins 11 and the load connection portion 2, or may be a so-called double-pole switch for turning on/off the power supply between both the plug pins 11 and the load connection portion 2. Further, the relay 31 may have a function of a well-known circuit breaker to block the power supply when an overcurrent or leakage is detected.

According to the above configuration, since the power supply can be turned off even if the temperature of only one of the PTC thermistors 50 is raised, it is possible to improve safety compared with a case where only one PTC thermistor 50 is provided.

In addition, since the resistance value of the series circuit of two PTC thermistors 50 is used, it is possible to avoid an increase in the number of parts or complication of a wiring unlike a case where the resistance values of a plurality of PTC thermistors 50 are individually detected.

Second Embodiment

Since a basic configuration of the present embodiment is the same as the configuration of the first embodiment, an illustration and description of the same configuration will be omitted.

In the present embodiment, when the voltage (detection voltage) Vd across the series circuit of the PTC thermistors 50 is equal to or greater than the determination voltage and, thus, the high temperature state is determined by the determination circuit 33, the drive circuit 32 does not turn off the relay 31, and a notification signal is sent to the control circuit 23 of the outside.

Figure 12:
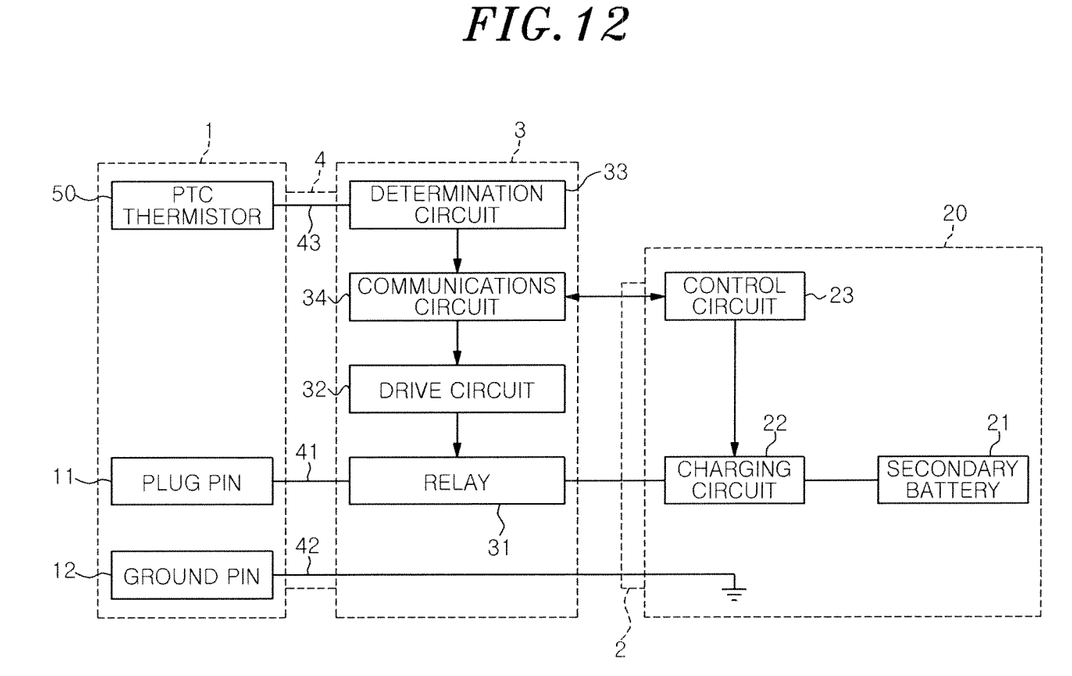
FIG. 12 is a schematic block diagram showing a power cord and a load in accordance with another embodiment of the present invention.

Specifically, as shown in FIG. 12, a vehicle 20 such as a plug-in hybrid vehicle and an electric vehicle including a secondary battery 21, a charging circuit 22 for charging the secondary battery 21, and a control circuit 23 for controlling the charging circuit 22 is assumed as the load connected to the load connection portion 2. The charging current to the secondary battery 21 from the charging circuit 22 increases or decreases under the control of the control circuit 23. Accordingly, the current flowing through the plug pins 11 and the load connection portion 2 also increases or decreases.

Further, the shut-off device 3 has the communications circuit 34 which sends a notification signal to the control circuit 23 when the high temperature state is determined by the determination circuit 33. The control circuit 23 controls the charging circuit 22 to reduce or stop the charging current to the secondary battery 21 upon receiving the notification signal. As a result, since the current flowing to the plug pins 11 is reduced or stopped, a decrease in the temperature can be expected. Furthermore, according to a signal transmitted from the control circuit 23 which has received the notification signal, the communications circuit 34 may control the drive circuit 32 to turn off the relay 31.

More specifically, e.g., the communications circuit 34 is configured to transmit/receive a voltage signal called a CPLT (control pilot) signal to/from the control circuit 23 of the vehicle 20. That is, when the plug 1 is connected to the power socket, the communications circuit 34 is activated by the power supply through the plug pins 11 and, first, the voltage value of the CPLT signal is set to a predetermined first voltage (e.g., 12 V). The control circuit 23 of the vehicle 20 reduces the voltage value of the CPLT signal to a second voltage (e.g., 9 V) lower than the first voltage when it detects that the voltage value of the CPLT signal is the first voltage.

When it is detected that the voltage value of the CPLT signal is reduced to the second voltage, the communications circuit 34 sets the CPLT signal as a rectangular wave with a predetermined frequency (e.g., 1 kHz), and sets the ON-duty (percentage of ON period in which the signal is at H level) of the rectangular wave as a value corresponding to the current capacity of an electric circuit between the plug pins 11 and the load connection portion 2. For example, the on-duty is set to 20% if the current capacity is 12 A, and the on-duty is set to 50% if the current capacity is 20 A. Upon recognizing the current capacity indicated by the on-duty, the control circuit 23 further reduces the voltage value at H level of the CPLT signal to a third voltage (e.g., 6 V).

When it is detected that the voltage value at H level of the CPLT signal is reduced to the third voltage, the communications circuit 34 controls the drive circuit 32 to turn on the relay 31 and starts the power supply to the charging circuit 22 through the load connection portion 2 from the plug pins 11. Thus, the secondary battery 21 begins to be charged by the charging circuit 22. The control circuit 23 controls the charging circuit 22 such that a maximum value of the charging current to the secondary battery 21 does not exceed the current capacity during charging of the secondary battery 21 by the charging circuit 22. Also, the control circuit 23 changes the maximum value of the charging current to the secondary battery 21 from the charging circuit 22 according to a variation in the on-duty of the CPLT signal during the operation of the charging circuit 22.

Further, the control circuit 23 monitors the voltage of the secondary battery 21, and restores the voltage value at H level of the CPLT signal from the third voltage to the second voltage when the voltage of the secondary battery 21 reaches a predetermined target value. When it is detected that the voltage value at H level of the CPLT signal is restored to the second voltage, the communications circuit 34 controls the drive circuit 32 to turn off the relay 31, and sets the voltage value of the CPLT signal as the first voltage.

In the case where the CPLT signal is used as described above, notification of the high temperature state can be achieved by changing the on-duty of the CPLT signal such that the current capacity to be notified is reduced. However, in order to actually reduce the current, the maximum value of the charging current corresponding to the current capacity which is notified by the changed on-duty of the CPLT signal needs to be smaller than the current value of the charging current immediately before the on-duty is changed. That is, at least, the current capacity which is notified at start-up needs to be greater than the minimum value of the current capacity which can be represented by the CPLT signal. Meanwhile, in a case where the control circuit 23 is configured to stop the charging circuit 22 when the on-duty of the CPLT signal becomes a predetermined value (e.g., 0), the notification of the high temperature state may be achieved by setting the on-duty of the CPLT signal to the predetermined value.

The present invention is also applicable to a three-phase AC power cord having three plug pins 11 in the plug 1.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A power cord comprising:
a plug including a plurality of plug pins which are adapted to be respectively inserted in plug pin insertion holes of a power socket and connected with the power socket, and a plurality of PTC (Positive Temperature Coefficient) thermistors, at least one of which is provided for each of the plug pins to detect a temperature of the corresponding plug pin; and
a load connection portion to be connected to a load,
wherein the PTC thermistors form one series circuit, and
wherein the power cord further comprises a shut-off device configured to turn off power supply to the load connection portion from the plug pins when a resistance value of the series circuit is equal to or higher than a predetermined value.

2. A power cord comprising:
a plug including a plurality of plug pins which are adapted to be respectively inserted in plug pin insertion holes of a power socket and connected with the power socket, and a plurality of PTC (Positive Temperature Coefficient) thermistors, at least one of which is provided for each of the plug pins to detect a temperature of the corresponding plug pin; and
a load connection portion to be connected to a load, which includes a control circuit for controlling an amount of a current inputted through the plug pins and the load connection portion,
wherein the PTC thermistors form one series circuit, and
wherein the power cord further comprises a communications circuit configured to transmit a notification signal to the control circuit when a resistance value of the series circuit is equal to higher than a predetermined value.

* * * * *